(12) United States Patent
Stenberg et al.

(10) Patent No.: US 8,498,635 B2
(45) Date of Patent: Jul. 30, 2013

(54) DYNAMIC FAULT ANALYSIS FOR A CENTRALLY MANAGED NETWORK ELEMENT IN A TELECOMMUNICATIONS SYSTEM

(75) Inventors: Kristina Stenberg, Skellefteå (SE); Magnus Vestin, Ursviken (SE); Torbjörn Lundmark, Ursviken (SE)

(73) Assignee: Tieto Oyi, Helsinki (FI)

( * ) Notice: Subject to any disclaimer, the term of this patent is extended or adjusted under 35 U.S.C. 154(b) by 233 days.

(21) Appl. No.: 12/936,885

(22) PCT Filed: Apr. 7, 2009

(86) PCT No.: PCT/SE2009/050360
§ 371 (c)(1),
(2), (4) Date: Dec. 30, 2010

(87) PCT Pub. No.: WO2009/126101
PCT Pub. Date: Oct. 15, 2009

(65) Prior Publication Data
US 2011/0099428 A1 Apr. 28, 2011

(30) Foreign Application Priority Data
Apr. 8, 2008 (EP) .................................... 08154218

(51) Int. Cl.
*H04W 24/00* (2009.01)
(52) U.S. Cl.
USPC .......... 455/423; 455/67.1; 370/252; 370/242; 370/250
(58) Field of Classification Search
USPC .................. 455/423, 67.1; 370/242, 252, 250
See application file for complete search history.

(56) References Cited

U.S. PATENT DOCUMENTS

| 5,408,218 A | 4/1995 | Svedberg et al. | |
| 6,012,152 A | 1/2000 | Douik et al. | |
| 6,877,051 B2 * | 4/2005 | Iwanojko et al. | 710/100 |
| 7,372,817 B2 * | 5/2008 | Kim | 370/242 |
| 2003/0217133 A1 * | 11/2003 | Ostrup et al. | 709/223 |

FOREIGN PATENT DOCUMENTS

| CN | 1492624 A | 4/2004 |
| CN | 101022366 A | 8/2007 |

OTHER PUBLICATIONS

Search Report dated Jul. 8, 2009 for International Application No. PCT/SE2009/050360 filed Apr. 7, 2009.
Chinese Office Action issued Oct. 30, 2012 in corresponding Chinese Patent Application No. 200980120134.4, and its English translation (12 pages).

\* cited by examiner

*Primary Examiner* — David Q Nguyen
(74) *Attorney, Agent, or Firm* — Drinker Biddle & Reath LLP

(57) ABSTRACT

Model based fault analysing in a base station in a mobile telecommunication system, the base station having a fault manager and resources adapted to transmit fault indication signals to the fault manager. The fault analysing including functions for receiving into the fault manager a predetermined fault rule model of said resources in a fault rule configuration file; implementing a fault analysis algorithm of predetermined rules for analysing received fault indication signals dependent on said predetermined fault rule model; generating an analysis tree data structure dependent on the fault rule configuration file; receiving from one of said resources a fault indication signal indicating identification and classification information; retrieving an applicable fault rule in the analysis tree data structure dependent on said fault indication signal; evaluating the result of the retrieved fault rule applied on said fault indication signal; generating an alarm signal dependent on said result of the applied fault rule.

12 Claims, 3 Drawing Sheets ly managed from a network management system. More specifically, the invention pertains to the architecture of the fault management function for a network element such as a radio base station.

DYNAMIC FAULT ANALYSIS FOR A CENTRALLY MANAGED NETWORK ELEMENT IN A TELECOMMUNICATIONS SYSTEM

This application is the National Stage of International Application No. PCT/SE2009/050360, filed Apr. 7, 2009, and claims benefit of Application No. EP 08154218.5, filed Apr. 8, 2008, both of which are herein incorporated by reference in their entirety.

FIELD OF THE INVENTION

The present invention pertains generally to fault analysis in network elements in a mobile telecommunications system that is centrally managed from a network management system. More specifically, the invention pertains to the architecture of the fault management function for a network element such as a radio base station.

BACKGROUND

In the base stations of a mobile telecommunications system that is centrally managed from a network management system there are a number of functions realised by software and hardware resources that support the activities of the base stations. These resources are usually devised to detect faults in input signals or in operation results. Fault signals are generated in the resources and are transmitted to a software based fault manager in the base station.

The increasingly complex nature of modern base stations entails that there are many sources for generation of fault signals, and there are also many instances where a single fault may give rise to a large number of consequential or side effect fault signals. An important task for the fault manager is therefore to analyse which faults to prioritize and to determine dependent on correlation and filtering of the fault signals if an alarm signal shall be generated and conveyed to the central network management system.

Model based fault analysis techniques are commonly used in fault managers to identify faults that shall be reported to the central network managements system. This requires definitions of all resources and any related faults that may occur as well as any correlations between the resources and rules for how to report an identified fault to the network management system. Commonly the fault manager receives faults in a resource perspective and is devised to transmit alarms to the network management system in a model perspective. Each fault analysis model depicts only one defined system, and a new model must be created each time the system is modified or the definition of the system is updated.

This is a problem for the manufacturers as well as for system operators since there is a constant need to add new features and resources to the telecommunication system. The fault analysis models are commonly hard-coded in the fault manager software. The introduction of new features and resources require a new or a modified model, and with the common technology this also requires the development and installation of new fault management software. This, in its turn, entails high costs for code development, verification and maintenance as well as an outage of the base station during the installation time. An alternative is to have the fault analysis algorithm implemented in the resource, which entails that the fault analysis algorithm is implemented in several instances, i.e. one instance of a fault analysis algorithm in each resource which again is ineffective in cost and maintenance.

There is therefore a need for a more flexible fault management software that enables a smother modification or updating of the fault analysis model.

RELATED ART

In the known art there are different approaches to the fault management issue.

The patent document U.S. Pat. No. 5,408,218 discloses a model-based alarm coordination system in a complex electrical system such as a telecommunications system. The alarm coordination system in this piece of related art coordinates primary and secondary alarm notifications in order to ascertain whether they are caused by a single fault or by multiple faults. The electrical system comprises a plurality of managed objects, for example base stations, each of which is viewed as a self-contained functional unit that is responsible for its own internal fault management. This system is designed to detect out-of-specification performance in the managed objects, and to differentiate between managed objects that have out-of-specification performance due to internal faults and managed objects that have out-of-specification performance due to faults in other managed objects. The coordination system is further designed to generate primary alarm notifications within those managed objects that are causing the faults, and secondary alarm notifications that are not causing the faults but which are affected by the fault-causing managed object. This disclosure does not address the feasibility of changing the model.

In the patent document U.S. Pat. No. 6,012,152 there is disclosed a software fault management system that operates from a central point of view with an objective to manage faults in all kinds of software based network elements of a telecommunications system. This piece of related art employs an expert system with distributed Artificial Intelligence in the shape of a plurality of agents that process software faults using a functional model from an information base, case based information and other management information. The system is made independent of technology specific implementations by representing the underlying switch design knowledge in a changeable form which is interpreted by the agents. A separation is thereby made between generic procedural inference mechanisms for diagnosing faults on one hand, and specific models of different network elements on the other hand. The agents work on different network elements and/or on different aspects of the software fault management process and cooperate in order to provide additional and more global information to assist in the diagnosis of problems in the network of the telecommunications system.

OBJECT OF THE INVENTION

The object of the present invention is to provide a solution to the problem of inflexibility in updating fault analysis models in the fault manager software of a base station in a telecommunications system.

SUMMARY OF THE INVENTION

In accordance with the invention the problem is solved by separating the fault analysis algorithm in the fault manager from the definition of the fault rules. The fault rules are held in a dynamic data structure that is traversed to find applicable fault rules in response to a received fault indication signal. The fault analysis algorithm uses the retrieved fault rules to evaluate the fault and to generate an alarm signal dependent on the fault rules. This architecture of the fault management enables dynamic and flexible updating of the fault rules.

According to an aspect of the inventive concept, the invention is applied as method, a telecommunications base station and a computer program product for model based fault analysing in a base station in a mobile telecommunication system. A base station in which the invention is applied comprises data processing means adapted to control the activities of the base station, a fault manager function realised by means of software code executable by the data processing means, and a plurality of software and/or hardware resources adapted to realise functions of the base station and to transmit fault indication signals to the fault manager code.

It is received into the fault manager a predetermined fault rule model of said resources in a fault rule configuration file. A fault analysis algorithm of predetermined rules for analysing received fault indication signals dependent on said predetermined fault rule model is implemented in the fault manager, and an analysis tree data structure is generated dependent on the fault rule configuration file.

In operation, a fault indication signals is received from one of said resources, the fault indication signal comprising identification and classification information. Upon receiving the fault indication signal, an applicable fault rule is retrieved from the analysis tree data structure dependent on said fault indication signal. The result of the retrieved fault rule applied on said fault indication signal is evaluated and an alarm signal is generated dependent on said result of the applied fault rule.

The fault rules can be updated dynamically at initiation or during runtime operation and according to an aspect of the invention, the fault rule configuration file is loaded for generating said analysis tree when initiating the fault manager function code. According to another aspect, a fault rule configuration file is loaded for generating said analysis tree in response to a load control signal. According to yet another aspect, a fault rule configuration file is loaded following the procedure of checking an update parameter devised for indicating an updated fault configuration file, and in response to said update parameter indicating the presence of an updated fault configuration file, loading an updated fault rule configuration file and generating an updated analysis tree data structure.

Effects of the invention are that the fault manager function is easy and flexible to update since the fault rules reside in a dynamic data structure, and advanced fault rules can be implemented without writing complex code.

BRIEF DESCRIPTION OF THE DRAWINGS

The invention will be further explained with reference to the enclosed drawings, wherein.

DESCRIPTION OF EMBODIMENT

Figure 1:
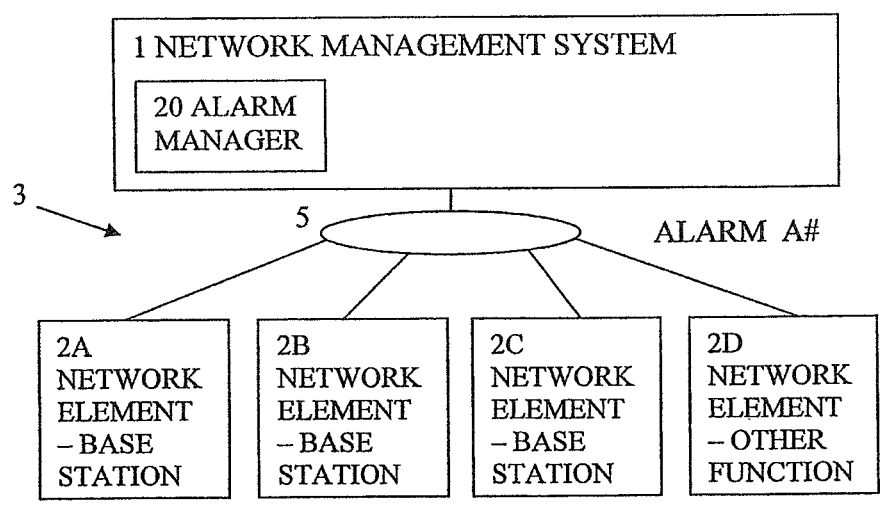
FIG. 1 shows a schematic overview of the structure of a telecommunications system in which the invention is typically realised.

The present invention of dynamic fault management is applied in a telecommunications system schematically illustrated in FIG. 1.

FIG. 1 shows a block diagram of a telecommunications network 3 with a central network management system 1 that is communicatively coupled preferably via a data communications network 5 to a plurality of network elements 2A-2D. There are numerous different types of network elements, and the figure illustrates mobile telephone radio base stations 2A, 2B, 2C and symbolically a network element 2D with some other function such as a router in the transmission network equipment. Each base station 2 and other such managed network element is provided with functional components in the shape of computer based hardware and other electronic hardware as well as computer program software designed to realise the different per se known functions of a telecommunications base station. In a typical telecommunications system there may be large a number of managed elements, with the managed elements preferably being communicatively coupled to the network management system via an internet protocol communications network.

The network management system and the network elements are based on computer technology in a per se known manner, thus including data processing means, data storage means, input/output interfaces and software programs specifically designed to realise different functional units of the system and the elements.

The communication between the network elements and the network management system includes communicating alarm signals A# for different types of predefined events or conditions in the respective network elements. The alarms are for example handled by an alarm manager 20 in the network management system in conventional manners that are outside the scope of this invention.

Figure 2:
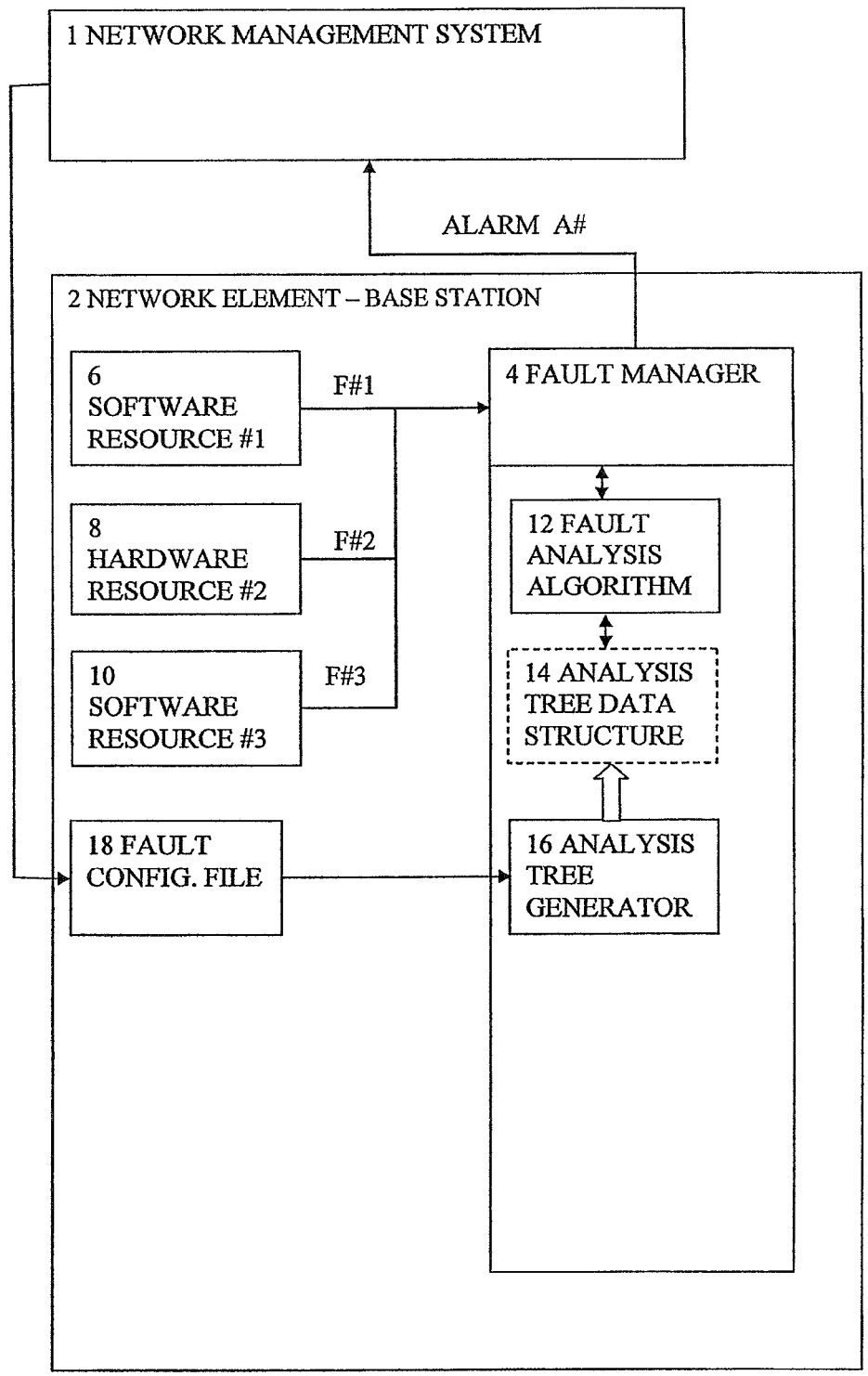
FIG. 2 shows schematically an embodiment of the invention with the an example of a network element in more detail.

FIG. 2 is a more detailed block diagram of an instance of a network element comprising the functionality for dynamic fault analysis according to the present invention. In FIG. 2 a central network management system NMS 1 is coupled to a plurality of a managed network elements, here exemplified with a network element in the shape of a radio base station 2 for a mobile telephone system. In a per se known manner the base station 2 is provided with a fault manager function (FM) 4 that is commonly realised in specifically designed software and executed by a data processing system provided in the base station.

The base station is provided with a number of software and hardware resources typically realising different functions in the base station, e.g. a first resource 6 in the shape of a software functionality SW#1, a second resource 8 in the shape of a hardware functionality HW#2 and third resource 10 in the shape of a software functionality SW#3. Such functionalities and resources are for example software and hardware functions related to a radio transmitter and receiver, or to climate control, i.e. cooling and heating within the base station.

Each of the resources is capable of transmitting a fault indication F#1, F#2 and F#3, respectively, to the fault manager 4. The fault manager 4 comprises a fault analysis algorithm 12 and an analysis tree generator 16, both of which usually but not necessarily are incorporated and compiled with the fault manager software.

A fault configuration file 18 comprising a predetermined fault rule model of the resources 6,8,10 is stored in a data storage area of the base station 4 and made accessible for the fault manager software to be loaded and input to the analysis tree generator 16. The analysis tree generator 16 is devised to generate a dynamic analysis tree data structure 14 dependent on the fault rule model represented in the fault configuration file 18. The analysis tree data structure 14 is then used by the fault analysis algorithm 12 to retrieve an applicable fault rule dependent on a fault indication signal received from any of the resources.

Figure 3:
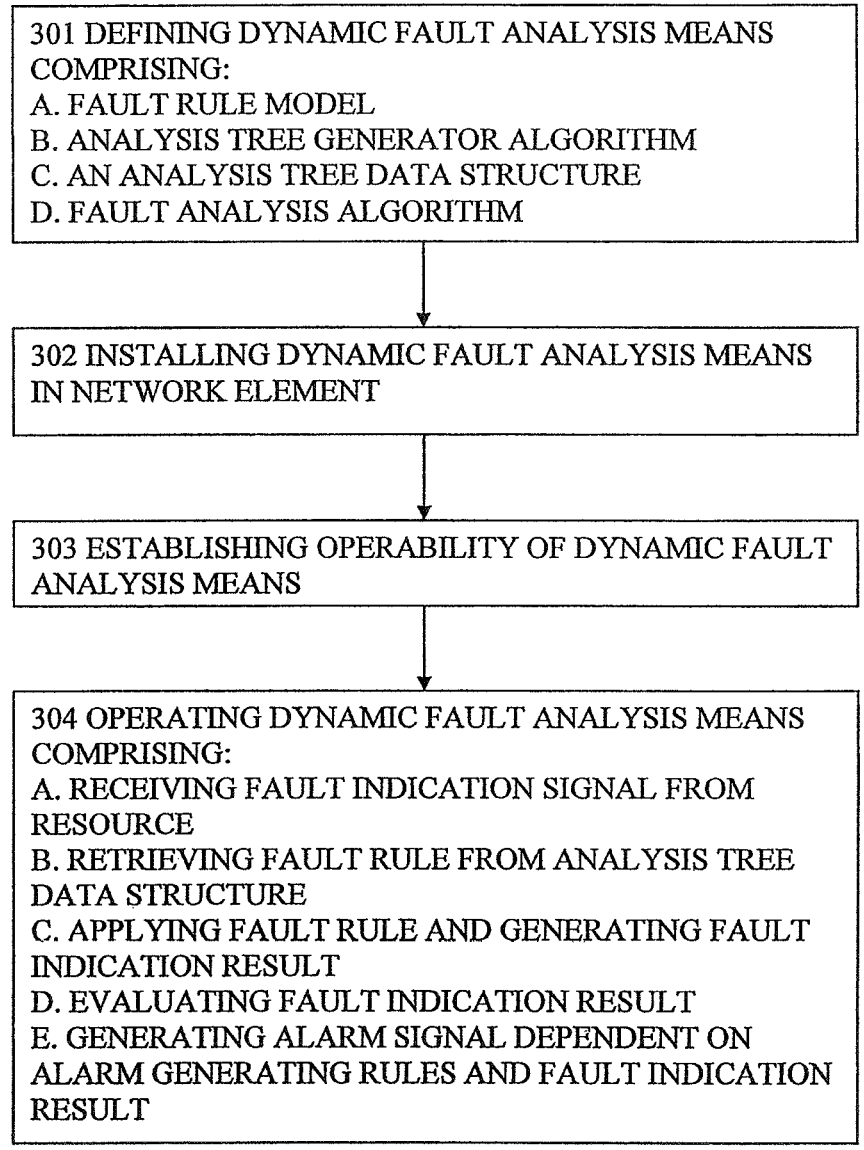
FIG. 3 shows a flow chart with an overview of an embodiment of a method in accordance with the inventive concept.

The inventive method is based on a separation of the fault model and the fault analysis algorithm that makes use of the fault model to determine a response to a fault signal received from any of the resources in a network element. The method comprises different phases as illustrated in the FIG. 3, reference is also made to FIG. 2.

301. A preparation phase of defining dynamic fault analysis means.

For the implementation of the inventive concept, the invention comprises the preparatory steps of defining dynamic fault analysis means dependent to an input of one or more fault rules, the dynamic fault analysis means comprising:
  a. A fault rule model for the resources in the current network element and described according to a predetermined syntax.
    A simple example of a fault rule: alarm 1=faultind 1 (Cf. F#2 in FIG. 2)
    This means that the alarm alarm_1 will be activated when the faultindication faultind_1 is active, and will be cleared when faultind_1 is cleared.
    Alarm rules can be combined with other fault indications in Boolean expressions,
    e.g. alarm_2=faultind_1 AND faultind_2, meaning that both faultind_1 and faultind_2 needs to be active before an alarm is active. The expressions can be made with any Boolean operator, AND, OR, XOR, NOT, ( ) For instance: alarm_3= (faultind_1 OR faultind_2) AND (faultind_3 AND NOT faultind4)
  b. An analysis tree generator algorithm for generating the analysis tree data structure dependent on a fault rule model defined according to the above syntax. The algorithm in accordance to the invention is based on per se known technology for parsing Boolean expressions and for building evaluation tree structures.
  c. An analysis tree data structure adapted to store fault rules.
  d. A fault analysis algorithm adapted to analyse a fault signal or fault message. The fault analysis algorithm is devised to traverse the analysis tree data structure to find and retrieve an applicable fault rule dependent on the received fault signal. The fault analysis algorithm is further devised to determine whether to generate an alarm signal dependent on predetermined alarm generation rules and dependent on the retrieved fault rule.

302. A setup phase of installing dynamic fault analysis means in network element.

The setup phase for the fault manager functionality in the network element comprises the following steps:
  a. Installing, in a data processing system of the network element, fault manager software code comprising code portions devised to implement the fault analysis algorithm.
  b. Storing, in a data storage means of the network element, a predetermined fault rule model in a fault rule configuration file.

303. A start-up phase of establishing the dynamic fault analysis means into operability.

The start-up phase of the fault management code according to an embodiment of the invention comprises the following steps:
  a. Initiating the fault analysis algorithm and the analysis tree generator as parts of a fault manager function code.
  b. Loading the fault rule configuration file as an input to the analysis tree generator.
  c. Generating, by means of the analysis tree generator, an analysis tree data structure dependent on the fault rule configuration file.

304. A run-time phase of operating the dynamic fault analysis means under running conditions.

In the run-time phase, the invention according to one embodiment comprises the following steps:
  a. Receiving from any of the resources a fault indication signal as an input to the fault manager. The fault indication signal is for example communicated in the shape of a message or a constant signal from a fault filter in the resource and comprises identification and classification information.
  b. Retrieving an applicable fault rule from the analysis tree data structure by means of the fault analysis algorithm and dependent on the received fault indication signal.
  c. Applying the retrieved fault rule on the fault indication signal and obtaining a result in terms of a fault indication response.
  d. Evaluating the result, i.e. the resulting fault indication response. The result or perhaps more typically may be treated as interim results and the evaluation be performed with a time delay such that a number of interim results occurring during a predetermined time interval are evaluated in relation to each other.
  e. Generating an alarm signal dependent on predetermined alarm generation rules and dependent on the evaluated fault indication response resulting from the fault indication signal. The alarm generation rules preferably includes a dependence on previously generated alarm signals, rules for turning off previous alarm signals and rules for generating new higher level alarms, as well as rules for feedback or acknowledgement of received fault signals to resources.

Updating the Fault Rule Model

The fault rule model can, as in one embodiment, be updated by storing an updated fault rule configuration file in the data storage means of the network element and then re-initiate the system as in the start-up phase. However, a preferred embodiment is configured to enable updating the fault rule model in run-time. A procedure for updating the fault rule model according to an embodiment of the invention comprises the steps of:
  1. Storing an updated fault configuration file corresponding to the updated fault rule model in the network element.
  2. Communicating from the network management system an update control signal to the fault manager of the network element.
  3. Receiving the update control signal as an input to the fault manager.
  4. Loading, in response to the update control signal, the updated fault rule configuration file as an input to the analysis tree generator.
  5. Generating, by means of the analysis tree generator, an updated analysis tree data structure dependent on the updated fault rule configuration file.

This embodiment of the invention thus enables input of the fault rules to the fault manager during runtime, and a any previously stored fault rule can thereby be replaced. A variation of this embodiment comprises checking an update parameter devised for indicating an updated fault configuration file. Thereafter, in response to said update parameter indicating the presence of an updated fault configuration file, loading an updated fault rule configuration file and generating an updated analysis tree data structure.

Further examples of fault rules comprises more complexity since the fault manager receives faults in a resource perspective and is devised to transmit alarms to the network management system in a model perspective. A fault rule according to a preferred format needs to specify on which model object type the alarm is to be generated and from which resource types the fault indications are sent, for example:

alarm_3@moType=faultind1@aResourceType AND faultind2@aResourceType

Note that fault rules can be expressed with "types" without any information on specific instantiation of a model object (MO) or resource. This allows for a generic way of expressing fault rule that can be multiply instantiated for a set of model objects of the same type. For the case when a model object, i.e. a resource or functionality in the network element, of a specific class can be instantiated >1 and thus appear in a plurality of instances in a running system, the inventive concept enables to specify only one alarm rule for this model object irrespective of the number of instances. This information must however be made available to the fault manager (FM) in runtime in some way. In embodiment of the invention this information is provided by a running managed object database.

For example: A system contains the software resource SWR in two instances; the SWR instances can emit faultind F#1. Assume that the SWR instances are owned by the model object MO#1 and that an alarm A#1 is to be emitted if F#1 from either SWR is active, then the alarm rule may be expressed as:

A#1@MO#1=F#1@SWR[x] OR F#1@SWR[x]

The [x] is interpreted by the fault manager FM as something FM needs to get as information in runtime from a model object owning system, e.g. a MOM db software module.

Another example: Assume there are 2 hardware resources R that can emit a faultindication F#1. Each R is managed by a model object MR. The alarm rule should be to emit an alarm A#1 on each model object MR if either of F#1@R is active. On the other hand, if both hardware resources are active, an alarm A#2 should be generated on another model object MX, and have alarm A#1 set to inactive. This can be expressed as a set of rules that are related:

A#1@MR[x]=F#1@R[x] AND NOT F#1@R[x]

A#2@MX=F#1@R[x] AND F#1@R[x]

When these fault rules are expanded with instance information received by the fault manager from model object db in runtime they become:

$$\left\{ \begin{array}{l} A\#1 @ MR[1] = F\#1 @ R[1] \text{ AND NOT } F\#1 @ R[2] \\ A\#1 @ MR[2] = F\#1 @ R[2] \text{ AND NOT } F\#1 @ R[1] \\ A\#2 @ MX = F\#1 @ R[1] \text{ AND } F\#1 @ R[2] \end{array} \right\}$$

This allows for a way to express correlation of fault indications from different resources.

Assume a further elaboration of the previous example. Assume the knowledge that alarm A#2 is related to a passive component that connects the two resources R that are both monitored.

The resources R[1] and R[2] may both detect a fault and emit F#1, and these events will be received by FM as 2 different events in time.

If fault rules are immediately evaluated this would lead to an A#1 active on first F#1, and then almost immediately when second F#1 arrives, the A#1 will be cleared and the A#2 will be activated.

This leads to an undesired alarm ripple, and to avoid this alarm rule evaluation is therefore preferably expressed so that an amount of time is allowed before evaluation of a rule upon changed input:

TIMER[100 ms]: F#1@R[x]

$$\left\{ \begin{array}{l} A\#1 @ MR[x] = F\#1 @ R[x] \text{ AND NOT } F\#1 @ R[x] \\ A\#2 @ MX = F\#1 @ R[x] \text{ AND } F\#1 @ R[x] \end{array} \right\}$$

This will be interpreted such that the fault manager FM will update the right hand side of the expressions, but wait for a defined time before evaluation. This allows for both events to be received before evaluation of the total expression is evaluated and enables the occurrence of alarm ripple.

Further, an alarm, e.g. A#1, is preferably defined in separate clauses, e.g.

A#1@MO1 = F#1@R

A#1

$$\left\{ \begin{array}{l} AlarmSlogan = \text{"This is an example alarm"} \\ EventType = \text{"Communications alarm"} \\ ProbableCause = \text{"Transmission error"} \end{array} \right\}$$

The dynamic fault analysis mechanism in accordance with the inventive concept has the effect that the fault analysis models and rules can easily be updated, and also allows for complex fault rules for an improved fault management and alarm generation.

The invention claimed is:

1. A method of analyzing faults based on models, the method performed at a base station in a mobile telecommunication system, the base station having data processing means adapted to control activities of the base station; the data processing means having a fault manager and a plurality of functional resources adapted to transmit fault indication signals to the fault manager, the method comprising the steps of:
receiving at the fault manager a predetermined fault rule model of said functional resources in a fault rule configuration file;
implementing a fault analysis algorithm of predetermined rules for analyzing received fault indication signals dependent on said predetermined fault rule model;
generating an analysis tree data structure dependent on the fault rule configuration file;
receiving from one of said functional resources a fault indication signal comprising identification and classification information;
retrieving an applicable fault rule in the analysis tree data structure dependent on said fault indication signal;
evaluating the result of the retrieved fault rule applied on said fault indication signal; and
generating an alarm signal dependent on said result of the applied fault rule.

2. The method of claim 1, wherein the fault rule configuration file is loaded for generating said analysis tree when initiating the fault manager.

3. The method of claim 1, wherein the fault rule configuration file is loaded for generating said analysis tree in response to a load control signal.

4. The method of claim 1, further comprising the steps of:
checking an update parameter devised for indicating an updated fault configuration file; and
in response to said update parameter indicating the presence of an updated fault configuration file, loading an updated fault rule configuration file and generating an updated analysis tree data structure.

5. A base station in a mobile telecommunication system, the base station having data processing means adapted to control activities of the base station, the data processing means having a fault manager and a plurality of functional resources adapted to transmit fault indication signals to the fault manager; the base station comprising:
means for receiving at the fault manager a predetermined fault rule model of said functional resources in a fault rule configuration file;
means for implementing a fault analysis algorithm of predetermined rules for analyzing received fault indication signals dependent on said predetermined fault rule model;
means for generating an analysis tree data structure dependent on the fault rule configuration file;
means for receiving from one of said functional resources a fault indication signal comprising identification and classification information;
means for retrieving an applicable fault rule in the analysis tree data structure dependent on said fault indication signal;
means for evaluating the result of the retrieved fault rule applied on said fault indication signal; and
means for generating an alarm signal dependent on said result of the applied fault rule.

6. The base station claim 5, further comprising means for loading the fault rule configuration file for generating said analysis tree when initiating the fault manager function code.

7. The base station claim 5, further comprising means for loading the fault rule configuration file for generating said analysis tree in response to a load control signal.

8. The base station claim 5, further comprising: means for checking an update parameter devised for indicating an updated fault configuration file; and in response to said update parameter indicating the presence of an updated fault configuration file, loading an updated fault rule configuration file and generating an updated analysis tree data structure.

9. A non-transitory computer readable medium having computer instructions recorded thereon, the computer instructions configured to perform a method of analyzing faults based on models when executed on a computer of a base station in a mobile telecommunication system, the base station having data processing means adapted to control activities of the base station, the data processing means having a fault manager and a plurality of functional resources adapted to transmit fault indication signals to the fault manager, the method comprising:
receiving at the fault manager a predetermined fault rule model of said functional resources in a fault rule configuration file;
implementing a fault analysis algorithm of predetermined rules for analyzing received fault indication signals dependent on said predetermined fault rule model;
generating an analysis tree data structure dependent on the fault rule configuration file;
receiving from one of said functional resources a fault indication signal comprising identification and classification information;
retrieving an applicable fault rule in the analysis tree data structure dependent on said fault indication signal;
evaluating the result of the retrieved fault rule applied on said fault indication signal; and
generating an alarm signal dependent on said result of the applied fault rule.

10. The non-transitory computer readable medium of claim 9, further comprising computer program code portions for: loading the fault rule configuration file for generating said analysis tree when initiating the fault manager function code.

11. The non-transitory computer readable medium of claim 9, said method further comprising:
loading the fault rule configuration file for generating said analysis tree in response to a load control signal.

12. The non-transitory computer readable medium of claim 9, said method further comprising:
checking an update parameter devised for indicating an updated fault configuration file; and
in response to said update parameter indicating the presence of an updated fault configuration file, loading an updated fault rule configuration file and generating an updated analysis tree data structure.

\* \* \* \* \*